May 25, 1954 W. L. HURFORD 2,679,554

ELECTRONIC SWITCHING APPARATUS

Filed May 31, 1950

4 Sheets-Sheet 1

Inventor:
Winslow L. Hurford,
by Merton D. Moore
His Attorney.

May 25, 1954

W. L. HURFORD 2,679,554

ELECTRONIC SWITCHING APPARATUS

Filed May 31, 1950

4 Sheets-Sheet 2

Inventor:
Winslow L. Hurford,
by Merton D. Moore
His Attorney.

May 25, 1954 W. L. HURFORD 2,679,554

ELECTRONIC SWITCHING APPARATUS

Filed May 31, 1950 4 Sheets-Sheet 3

Inventor:
Winslow L. Hurford,
by Merton D. Moore
His Attorney.

May 25, 1954

W. L. HURFORD 2,679,554

ELECTRONIC SWITCHING APPARATUS

Filed May 31, 1950

4 Sheets-Sheet 4

Inventor:
Winslow L. Hurford,
by Merton D. Moore
His Attorney.

Patented May 25, 1954

2,679,554

UNITED STATES PATENT OFFICE 2,679,554

ELECTRONIC SWITCHING APPARATUS

Winslow L. Hurford, North Syracuse, N. Y., assignor to General Electric Company, a corporation of New York Application May 31, 1950, Serial No. 165,167

4 Claims. (Cl. 179—171)

The present invention relates to electrical switching apparatus and has particular application to the television arts where it is desired to effect a transition from one televised picture to another on a television screen at the receiver, for example, where it is desired to fade one picture out and fade another picture in on the same receiver screen. In order to obtain a smooth transition free from transient surges with the attendant pleasing subjective effect, it is important that the rate of rise of the second picture on the receiver screen be balanced against the rate of decay of the first picture. It is further important that the light level at which the first picture starts to decay and the level to which the second picture builds up be sharply defined and be maintained essentially the same.

Accordingly, it is an important object of my invention to provide improved means for effecting a smooth transition from one television picture to another.

An exemplary embodiment of my invention comprises two signal amplifiers having a common plate load impedance. The gain of each amplifier is controlled by resistance-capacitance networks having diode level setters connected in the grid circuit of each amplifier. Normally one amplifier is conducting and the other is nonconductive. By actuation of a switch one network is permitted to discharge while the other network is permitted to charge so that the amplifier that was "on" is now "off" and vice versa. The diode level setters set the value to which the capacitors in the network charge. By appropriately choosing the value to which the capacitors discharge a "fade" or a "lap" dissolve may be achieved. By a "fade" is meant a transition in which the first picture decays or dissolves to substantial zero light level before the second picture starts to build up. By a "lap" is meant a transition in which the second picture starts to build up before the first picture has completely decayed.

Accordingly, it is also an important object of my invention to provide means for producing a "lap" or a "fade" between pictures on a television screen.

A general object of my invention is to provide improvements in electrical switching circuits.

Figure 1:
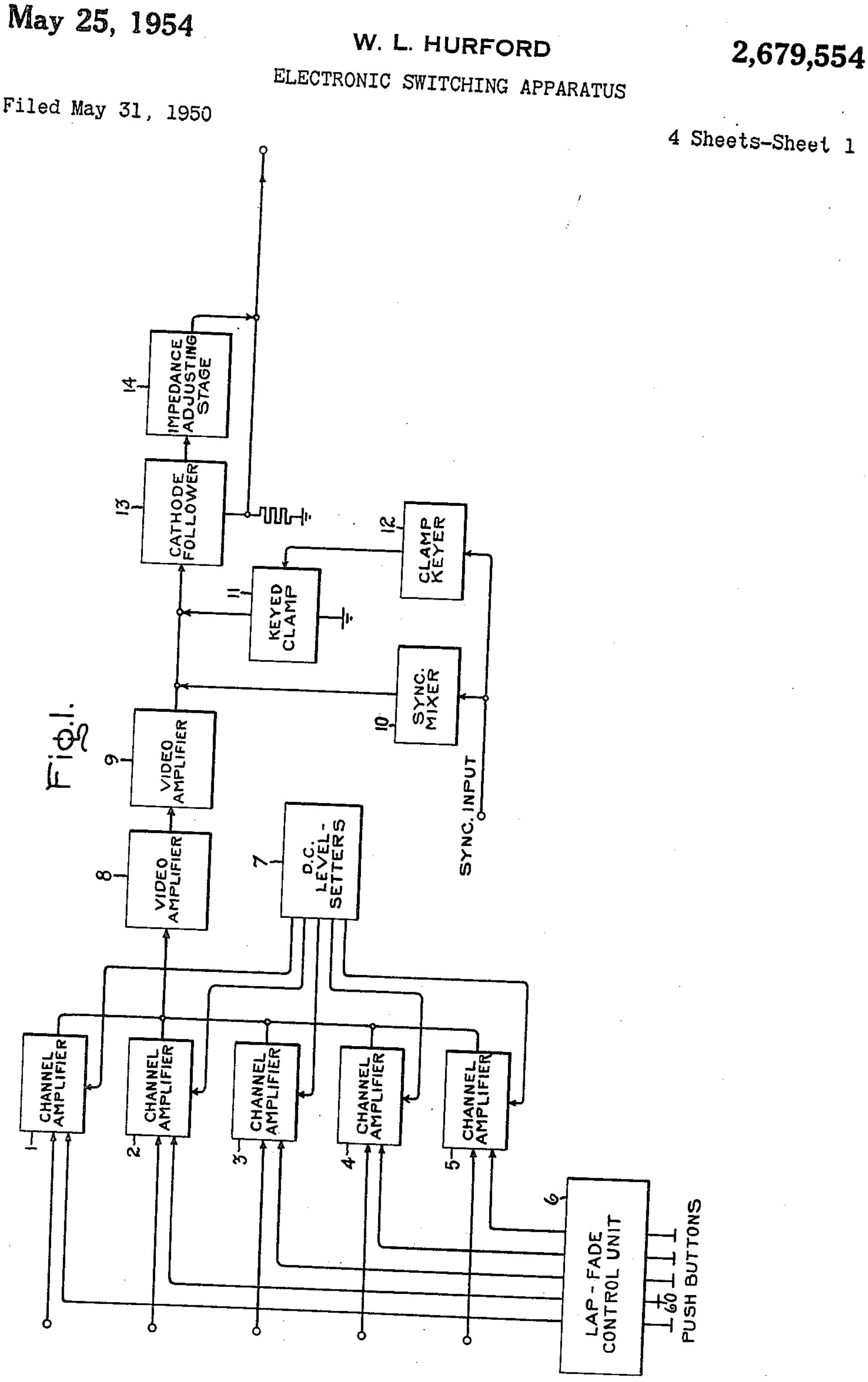
Figure 2:
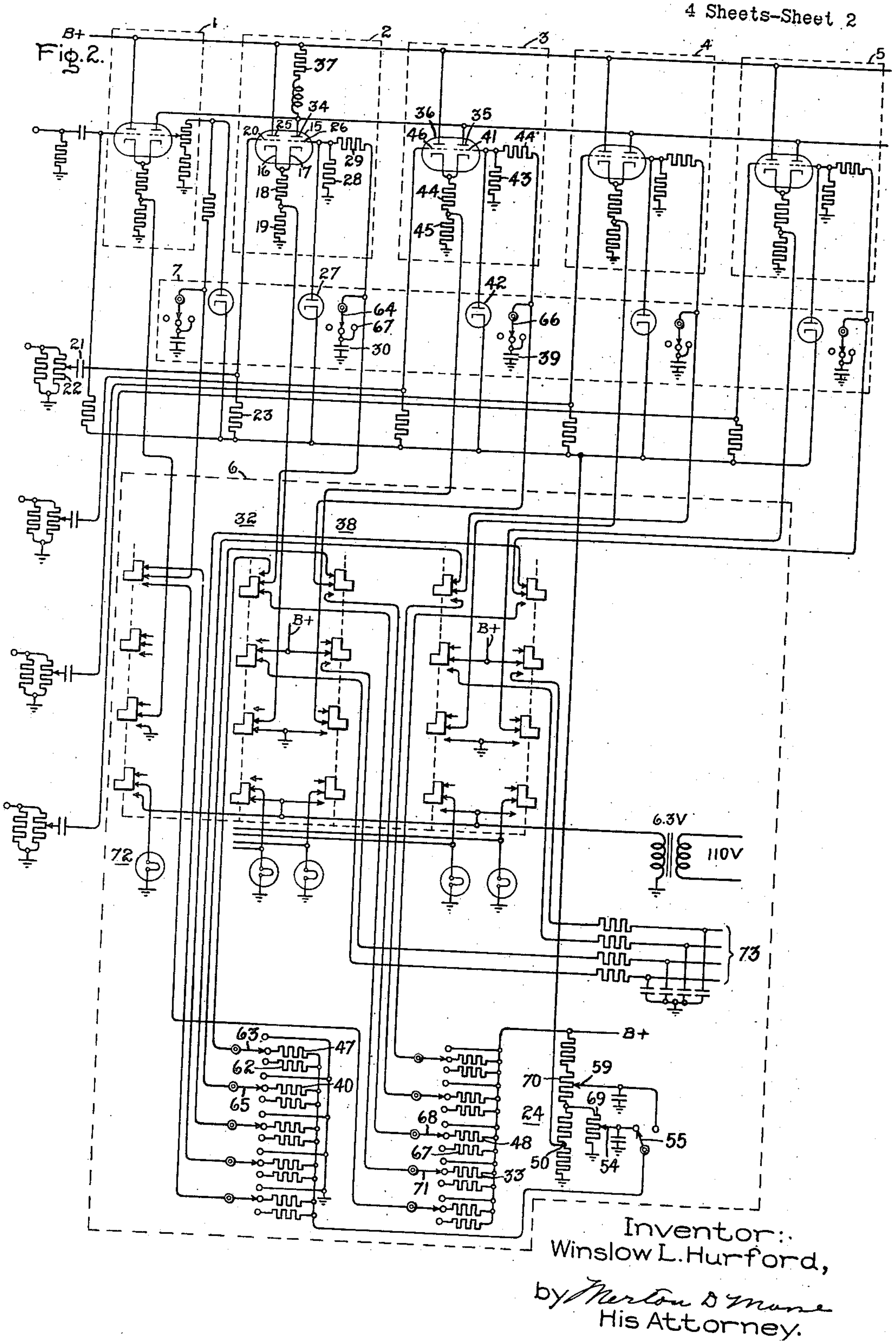
Figure 3A:
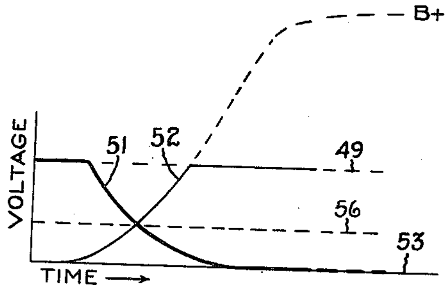
Figure 3B:
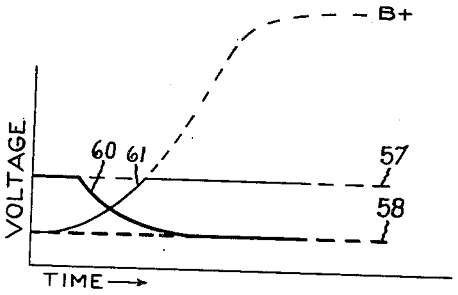
Figure 4:
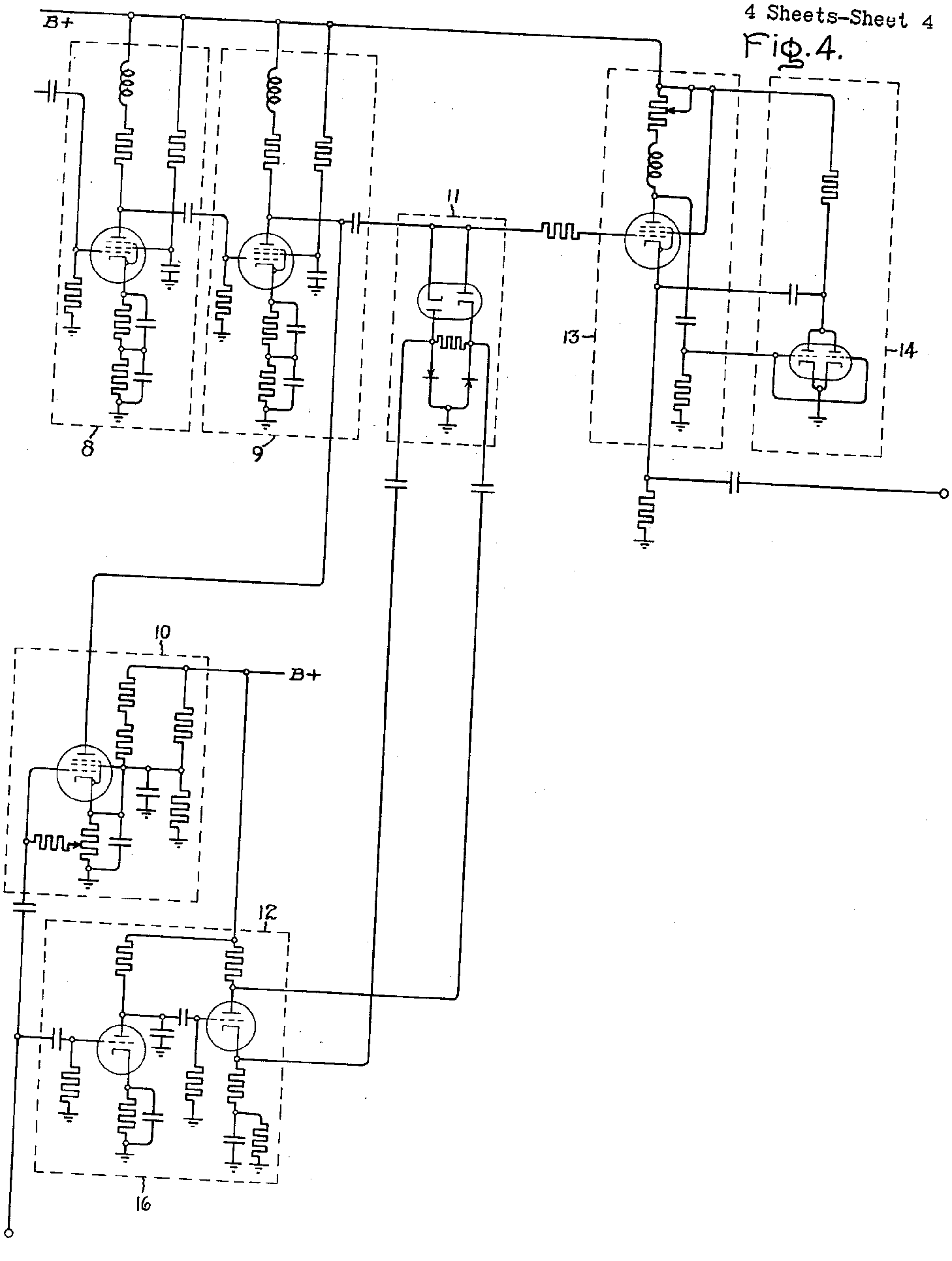

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Fig. 1 shows a block diagram of a system embodying my invention; Fig. 2 shows that portion of the detailed circuits of the system of Fig. 1 comprising the channel amplifiers, the D.-C. level setters and the lap-fade control unit; Fig. 3A is a diagram showing the manner in which the gain of one channel amplifier is permited to decay from a predetermined level while at the same time the gain of another channel amplifier is permitted to build up to a predetermined level or value; Fig. 3B is a diagram showing another way in which the gain of one channel amplifier is permitted to decrease from a predetermined value while at the same time the gain of another channel amplifier is permitted to increase to a predetermined value; Fig. 4 shows the circuit details of the remaining elements shown in block form in Fig. 1.

Referring now to Fig. 1, there is shown a block diagram of a system embodying my invention. The system comprises a group of channel amplifiers which may be two or more in number. In the figure there are shown five channel amplifiers 1, 2, 3, 4 and 5. Each of the channel amplifiers may be fed video signals coming from a variety of sources, for example, from studio television cameras. The lap-fade control unit 6 and the D.-C. level setters 7 control the conductivity of the channel amplifiers. In the general operation of this system only one channel amplifier is active in permitting the passage of a signal on through the system. The remaining channel amplifiers are held cut off by the lap-fade control unit 6. To effect a transition from one picture to another a push-button in the lap-fade control unit for example push-button 60, shown in the lower left-hand corner of Fig. 1, is depressed to cause the amplifier that was previously conductive to become nonconductive and to cause the amplifier associated with the push-button depressed to become conductive to pass the second picture signal. The manner in which this latter function is achieved will become apparent from a consideration of the detailed circuits shown in Fig. 2.

The remaining portions on the block diagram show elements for amplifying the video signal from the channel amplifiers and for suitably handling the signal so that it can be fed into other studio equipment prior to transmission over the air. Video amplifiers 8 and 9 amplify the video signal obtained from the channel amplifiers. Synchronizing signal mixer 10 performs the function of mixing the synchronizing signals with the video signal to form the television signal. The keyed clamp 11 and the clamp keyer 12 perform the function of reinserting the proper unidirectional component into the signal coming from the video amplifier 9. The video signal from the video amplifier 9 with the proper D.-C. insertion and with the synchronizing signals is fed into a cathode follower 13 which feeds an impedance adjusting stage 14. The impedance adjusting stage is for the purpose of adjusting the impedance at the driving point of an output line to the impedance presented by the line.

Referring now to Fig. 2 there is shown a schematic diagram of a portion of the block diagram of Fig. 1 comprising the channel amplifiers 1, 2, 3, 4 and 5, the lap-fade control unit 6 and the D.-C. level setters 7. The manner of operation of the circuit will best be understood by focusing attention on the operation of two channel amplifiers, for example, channel amplifiers 2 and 3, during the switching operation. Channel amplifier 2 comprises a dual triode type of electron discharge device 15, each triode section having an anode, a cathode and a grid. The cathodes 16 and 17 are connected together and are also connected to ground through resistances 18 and 19. The grid 20 of the left-hand section of electron discharge device 15 is connected to a source of video signal through a coupling capacitor 21 and a voltage divider 22. The grid 20 is also connected through a grid resistor 23 to a positive point upon voltage divider 24. The plate or anode 25 is connected to B+ potential. The grid 26 of the right-hand section of electron discharge device 15 is connected through a diode or rectifying element 27 to the same positive potential on the voltage divider 24 that the grid 20 of the left-hand section of electron discharge device 15 is connected to. The plate of the diode 27 is connected to the grid 26 and the cathode of the diode 27 is connected to the voltage divider 24. The grid 26 is also connected to a voltage divider comprising resistances 28 and 29 which are connected to a source of B+ potential through resistance 33. One end of capacitor 30 is connected to ground and the other end of capacitor 30 is connected through a switch 32 and a resistance 33 to the same source of B+ potential.

The circuit connections of channel amplifier 3 are similar to the circuit connections of channel amplifier 2. The anodes or plates 34 and 35 of electron discharge devices 15 and 36 are connected through a common plate load impedance 37 to a source of B+ potential. It should be observed that switch 32 is associated with the circuits of channel amplifier 2 and that switch 38 is associated with the circuits of channel amplifier 3. Since the switch 38 is not depressed, the grid side of capacitor 39 is connected through a switch 38 and discharge resistor 40 to a positive point on voltage divider 24.

In the general operation of the system only one channel amplifier is passing a signal just before the transition period when it is desired to change from one scene or picture to another. With switch 32 depressed and with switch 38 up, channel amplifier 2 would be conducting and channel amplifier 3 would be cut off, that is, the signal coming into channel amplifier 2 would be permitted to pass through while the signal coming into channel amplifier 3 would be blocked. With switch 32 in the down position grid 26 of electron discharge device 15 is connected to a source of B+ potential through voltage divider comprising resistances 28, 29. The potential applied to the grid is limited by means of the diode 27 which has its cathode connected to a point intermediate ground and B+. The positive bias potential applied to grid 26 permits the black negative video signal coupled to grid 20 to be passed by the channel amplifier 2. With switch 38 in the up position grid 41 of channel amplifier 3 is connected to a potential point on voltage divider 24 which is less positive than the potential applied to grid 26 by an amount sufficient to render channel amplifier 3 nonconducting to any video signal appearing at the input grid 46 of channel amplifier 3.

When a channel amplifier is conductive to a video signal applied to its input terminals both sections of the amplifier pass current. When a channel amplifier is non-conductive to a video signal applied to its input terminal only the left section passes current. Accordingly a higher cathode resistance is needed in the latter case to supply sufficient bias potential to the right section to maintain it cut off. With switch 32 down resistance 19 is shorted out of the circuit of channel amplifier 2. With switch 38 up resistance 45 is connected in the cathode circuit of channel amplifier 3.

The switch sections for each of the channel amplifiers are mechanically interlinked so that only one switch can be in the down position at a time. In order to change from one picture to another the switch associated with the corresponding amplifier to which the desired signal is applied is depressed. This causes the switch section of the amplifier that has previously been passing a signal to assume its up position. Let us suppose that the switch section 38 of channel amplifier 3 has been depressed causing the switch section 32 of channel amplifier 2 to assume its up position. It will be recalled that channel amplifier 2 has been amplifying a signal which has appeared across load impedance 37 common to all the channel amplifiers. When the switch section 32 of channel amplifier 2 is in the up position the capacitor 30 which has been charged to essentially B+ potential starts to discharge through resistance 47 to a point which is below B+ potential. The potential on the grid 26 of the right section of channel amplifier 2 will gradually decrease to a value sufficient to cut the channel amplifier 2 off. This operation is assisted by switching cathode resistance 19 into the circuit when the switch 32 is in the up position. Channel amplifier 2 now is in the nonconductive condition that channel amplifier 3 was in before the push-button associated with switch 38 was depressed.

While the signal coming through channel amplifier 2 has progressively decreased the signal coming through channel amplifier 3 has steadily increased to the same level from which the signal from channel amplifier 2 has decreased. The manner in which this was done will be apparent from the following considerations. The depressing of switch 38 of the channel amplifier 3 connected the capacitor 39 through a charging resistance 43 to B+ potential. A charging of capacitor 39 caused a rise in the potential at the grid 41 of the right-hand section of channel amplifier 3 at a rate determined by the time constant comprising principally capacitor 39 and resistance 43. The positive potential on grid 41 is not allowed to increase indefinitely but is held to a predetermined value by means of the diode level setter 42, one end of which is connected to the grid the other end is connected to a predetermined point on voltage divider 24. The diode level setter 42 may be any suitable rectifier device which presents a low impedance to voltages of one polarity and a high impedance to voltages of the opposite polarity applied to its terminals. Channel amplifier 3 now is in the conductive condition that channel amplifier 2 was in before the push-button associated with switch 38 was depressed. The operation of rendering channel amplifier 3 conductive is assisted by disconnecting cathode resistance 45 from the cathode circuit in the switching operation.

The manner in which the gain of one channel amplifier is permitted to decrease from a predetermined value while at the same time the gain of another channel amplifier is permitted to increase to a predetermined value will be better understood by considering Figs. 3A and 3B. In Fig. 3A there are shown curves of grid voltage versus time. The upper ordinate 49 of Fig. 3A represents the voltage on the grid of a channel amplifier 2 just prior to the aforementioned switching operation. This value corresponds to the positive potential of point 50 on voltage divider 24. Curve 51 represents the potential on the grid 26 of the right-hand section of channel amplifier 2 during the transitional time after switch 38 of channel amplifier 3 is depressed. The shape of curve 51 is determined principally by the time constant circuit comprising resistance 47 and capacitor 30. The shape of curve 51 may be changed by connecting a different resistance 62 in the grid discharge circuit by means of switch 63. When switch 63 connects the grid circuit of the right-hand section of electron discharge device 15 to ground and at the same time capacitor 30 is removed from the grid circuit by switch 64 the potential of grid 26 drops abruptly to render channel amplifier 2 abruptly nonconductive. Curve 52 represents the voltage on the grid 41 of the right-hand section of channel amplifier 3 after the push-button of channel amplifier 3 is depressed. The shape of curve 52 is determined principally by the time constant circuit comprising resistance 48 and capacitor 39. The rate of build up of grid potential in channel amplifier 3 may be changed by connecting a different resistance 67 in the charging circuit by means of switch 68. When switch 68 connects the grid circuit directly to B+ and at the same time capacitor 39 is removed from the grid circuit by means of switch 66, the potential of grid 41 rises abruptly to render channel amplifier 3 abruptly conductive. The charging characteristics of the other channel amplifiers may be similarly changed. The lower level 53 of the voltage to which the grid 26 of right section of channel amplifier 2 drops is determined by the value to which the capacitor 30 is discharged and particularly is determined by the point 54 on the voltage divider 24 to which capacitor 30 is connected through switch 55. The dotted portion of curve 52 represents the way in which the voltage would rise on grid 41 in a circuit not having a diode level setter. The dotted ordinate 56 represents the value of grid potential at which the amplifiers are cut off, that is, become nonconductive or blocked. Potential points 50 and 54 on voltage divider 24 are chosen to form the curves of Fig. 3A so that the picture coming through channel amplifier 2 will fade dissolve from a full value to zero at which time the picture coming through channel amplifier 3 will build up from zero value to full value. Since by the provision of diode level setters only a small portion of an exponentially rising curve is utilized in the operation of the channel amplifier, an essentially linear rise and decay in the signal levels from the channel amplifiers is obtained. Consequently a smooth transition from one picture to another with a minimum of transient surges is achieved. The characteristic picture effect produced by the operation of the channel amplifiers depicted in Fig. 3A is called a "fade" that is one picture is completely faded before the other picture is permitted to build up.

The rate of discharge or the rate of decrease of the conductivity of the channel amplifier 3 is determined by the time constant circuit comprising principally capacitor 39 and the resistance 47. This time constant may be varied by means of switches 65 and 66 which permit different combinations of resistance and capacity in the discharge circuit of grid 41. The switches 65 and 66 may be operated together so that when capacitor 39 is disconnected from the grid circuit of the right-hand section of electron discharge device 36, the grid circuit is connected through switch 65 to ground. The rate of charge or rate of increase of the conductivity of channel amplifier 2 is determined by the time constant comprising principally capacitor 30 and resistance 33. This time constant may be varied by means of switches 71 and 64 which permit different combinations of resistance and capacity in the charging circuit of grid 26. The switches 71 and 64 may be operated together so that when capacitor 30 is disconnected from the grid circuit the grid circuit is connected through switch 63 to ground.

Referring now to Fig. 3B there are shown curves of grid voltage as a function of time for a "lap" picture effect. The picture effect in which one picture is permitted to build up before the other has completely faded is called a "lap." The upper level to which the grid potential of the channel amplifier is permitted to rise is denoted by ordinate 57. The cutoff potential of the channel amplifiers is represented by the ordinate 58. The value to which the capacitors 30 and 39 are permitted to discharge is set at a higher value corresponding to point 59 on voltage divider 24. Setting the discharge potential point 59 higher means that the curves 60 and 61 representing the grid voltages applied to the right-hand sections of channel amplifiers 2 and 3 intersect above the cutoff ordinate 58. Consequently when switch 38 is depressed the picture from channel amplifier 3 starts to build up before the picture from channel amplifier 2 has completely dissolved or decayed.

With switch 55 connecting potentiometer 69 in circuit, a "fade" dissolve is obtained whenever a channel amplifier switch is actuated. Potentiometer 69 permits adjustment of the cross over point of curves 51 and 52 of Fig. 3A with respect to the cutoff bias 56. With switch 55 connecting potentiometer 70 in circuit a "lap" dissolve is obtained whenever a channel amplifier switch is actuated. Potentiometer 70 permits adjustment of the cross over point of curves 60 and 61 with respect to the cutoff bias 58.

Channel amplifiers 1, 4, and 5 are substantially identical to channel amplifiers 2 and 3. By depressing the channel amplifier switch associated with any of the channel amplifiers, it becomes conductive and the amplifier that was previously conductive becomes nonconductive in the manner described above in connection with channel amplifiers 2 and 3.

In Fig. 2, the pilot lights 72 indicate when a particular channel is on the "air." The connections 73 go to remote locations, for instance to studio cameras to indicate at that point when a particular program is being televised.

Referring now to Fig. 4 there are shown circuit elements of applicant's system which are entirely conventional and it is believed that their function will be apparent upon inspection without detailed explanation. These elements which are set forth in blocked diagram in Fig. 1 comprise amplifiers 8 and 9, the synchronizing signal mixer 10, the keyed clamp 11, the cathode follower 13 and the impedance adjusting stage 14. The video signal coming from the channel amplifiers is fed into the video amplifiers 8 and 9. Since the unidirectional component of the video signal supplied to the channel amplifiers is removed by the video amplifiers a keyed clamp 11 is used to reinsert the unidirectional component. The clamp 11 is keyed by synchronizing signals fed into the clamp keyer 12. The keyed clamp 11 and clamp keyer 12 are of the kind disclosed in U. S. Patents Nos. 2,299,945 and 2,313,906 and further disclosed in an article by K. R. Wendt in R. C. A. Review, March 1948. The synchronizing signal is suitably mixed with the video signal from the video amplifier by the synchronizing signal mixer 10 before the clamping operation is effected. The video signal with the synchronizing signal and the proper D.-C. reinsertion is fed into a cathode follower 13 prior to being applied to an impedance adjusting stage 14 and prior to being supplied to a transmitter for broadcast purposes.

While I have shown a particular embodiment of my invention, it will of course be understood that I do not wish to be limited thereto since many modifications, both in the circuit arrangement and in the instrumentalities employed may be made and I therefore contemplate by the appended claims to cover any such modifications as fall within the true spirit and scope of my invention.

What I claim as new and desire to secure by Letters Patent of the United States is:

1. In combination, a pair of electron discharge amplifiers each having a grid, a cathode, and an anode, a cathode resistor connecting each said cathode to ground, individual signal sources connected between the grids of respective amplifiers and ground, an output circuit connected between the anode of each of said amplifiers and ground, and means to vary the bias of said amplifiers in opposite senses to render them alternately operative, said bias varying means comprising a pair of unilaterally conductive devices, each connected between the grid of a respective one of said amplifiers and a point of reference potential, said devices each being poled to be non-conductive when the voltage at said grid is below said reference potential and to be conductive when said voltage at said grid exceeds said reference potential, a pair of capacitors, one connected between the grid of each amplifier and ground and means simultaneously to charge either capacitor to cause conduction of the respective unilaterally conductive device thereby to render the corresponding amplifier operative and to discharge the other of said capacitors to render the corresponding amplifier non-operative, the magnitude of said reference potential being selected in relation to the voltage variations on said capacitor due to the charging thereof so that the voltage-time characteristic variations impressed on said grid as their values approach the maximum value determined by the corresponding reference potential and unilaterally conductive device are substantially linear.

2. In combination, a pair of electron discharge amplifiers each having a grid, a cathode, and an anode, a cathode resistor connecting each said cathode to ground, individual signal sources connected between the grid of respective amplifiers and ground, an output circuit connected between the anode of each of said amplifiers and ground, and means to vary the gain of said amplifiers in opposite senses in a manner to render them alternately operative, said gain varying means comprising a pair of unilaterally conductive devices, each connected between the grid of a respective one of said amplifiers and a point of reference potential, each of said devices being poled to be non-conductive when the voltage at said grid is below said reference potential and to be conductive when said voltage at said grid exceeds said reference potential, said reference potential corresponding to a predetermined gain of each of said amplifiers, a pair of capacitors each shunted by a resistance, a portion of one resistance being connected between the grid of one of said amplifiers and ground, a portion of the other resistance being connected between the grid of the other of said amplifiers and ground, and means simultaneously to charge either capacitor to cause conduction of the respective unilaterally conducting device and thereby to render said corresponding amplifier operative and to discharge the other of said capacitors to render the corresponding amplifier non-conductive, the magnitude of said reference potential being selected in relation to the voltage variations on said capacitor due to the charging thereof so that the voltage-time characteristic variations impressed on said grid as their values approach the maximum value determined by the corresponding reference potential and unilaterally conductive device are substantially linear.

3. In combination, a pair of electron discharge amplifiers each having a grid, a cathode, and an anode, a cathode resistor connecting each said cathode to ground, individual signal sources connected between the grid of respective amplifiers and ground, an output circuit connected between the anode of each of said amplifiers and ground, a pair of unilaterally conductive devices, each connected between the grid of a respective one of said amplifiers and a point of reference potential, each of said devices being poled to be conductive when the voltage at said grid exceeds said reference potential and to be non-conductive when the voltage on said grid is below said reference potential, a pair of capacitors, one connected between the grid of each amplifier and ground, and means simultaneously to charge either capacitor at a predetermined rate to a voltage above said reference potential thereby to cause conduction of the respective unilaterally conductive devices thereby to increase the gain of said amplifier at said predetermined rate to a maximum value determined by the magnitude of said reference potential and simultaneously to discharge the other of said capacitors, the magnitude of said reference potential being selected in relation to the voltage variations on said capacitor due to the charging thereof so that the voltage-time characteristic variations impressed on said grid as their values approach the maximum value determined by the corresponding reference potential and unilaterally conductive device are substantially linear.

4. In combination, a pair of electron discharge amplifiers each having a grid, a cathode, and an anode, a cathode resistor connecting each said cathode to ground, individual signal sources connected between the grids of respective amplifiers and ground, an output circuit connected between the anode of each of said amplifiers and ground, bias controlling means to supply a gradually increasing bias to either of said amplifiers and a simultaneously decreasing bias to the other of said amplifiers, said bias controlling means including a capacitor connected between the grid of each amplifier and ground, and means to equalize the maximum bias values applied to said grids, said equalizing means comprising a pair of unilaterally conductive devices each connected between the grid of a respective one of said amplifiers and a point of reference potential and poled in a direction to be conductive when the voltage at said grid exceeds said reference potential and to be non-conductive when the voltage at said grid is below said reference potential, the magnitude of said reference potential being selected in relation to the voltage variations on said capacitor due to the charging thereof so that the voltage-time characteristic variations impressed on said grid as their values approach the maximum value determined by the corresponding reference potential and unilaterally conductive device are substantially linear.

UNITED STATES PATENTS

References Cited in the file of this patent

| Number | Name | Date |
|---|---|---|
| 2,081,127 | Konkle | May 18, 1937 |
| 2,233,317 | Konkle | Feb. 25, 1941 |
| 2,240,420 | Schnitzer | Apr. 29, 1941 |
| 2,412,279 | Miller, Jr. | Dec. 10, 1946 |
| 2,434,929 | Holland et al. | Jan. 27, 1948 |
| 2,490,561 | Ussler, Jr. | Dec. 6, 1949 |
| 2,516,556 | Duke | July 25, 1950 |
| 2,521,824 | Brown, Jr. | Sept. 12, 1950 |
| 2,535,325 | Smeltzer | Dec. 26, 1950 |
| 2,535,471 | White et al. | Dec. 26, 1950 |
| 2,546,338 | Glasford | Mar. 27, 1951 |
| 2,610,260 | Moffett | Sept. 9, 1952 |